US008943323B2

(12) United States Patent
Brown et al.

(10) Patent No.: US 8,943,323 B2
(45) Date of Patent: *Jan. 27, 2015

(54) SYSTEM AND METHOD FOR PROVISIONING DEVICE CERTIFICATES (75) Inventors: Michael K. Brown, Kitchener (CA); Michael S. Brown, Waterloo (CA); Michael Kirkup, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,319

(22) Filed: May 1, 2012

(65) Prior Publication Data
US 2012/0216042 A1 Aug. 23, 2012

Related U.S. Application Data (63) Continuation of application No. 11/458,783, filed on Jul. 20, 2006.

(51) Int. Cl.
*H04L 9/32* (2006.01)
*H04L 29/06* (2006.01)
*H04W 12/06* (2009.01)

(52) U.S. Cl.
CPC ............ *H04L 9/3268* (2013.01); *H04L 9/3226* (2013.01); *H04L 63/0823* (2013.01); *H04L 9/3263* (2013.01); *G06F 2221/2129* (2013.01); *H04W 12/06* (2013.01); *H04L 2209/80* (2013.01)
USPC ........... 713/175; 713/155; 713/156; 713/157; 713/158; 380/282; 705/65

(58) Field of Classification Search
CPC . H04L 9/3263; H04L 9/3268; H04L 63/0823; G06F 2221/2129
USPC .................. 713/155–158, 173, 175; 380/282; 705/65
See application file for complete search history.

(56) References Cited

U.S. PATENT DOCUMENTS 6,233,577 B1 5/2001 Ramasubramani et al.
6,477,150 B1 11/2002 Maggenti et al.
(Continued)

FOREIGN PATENT DOCUMENTS

EP 1494429 1/2005
WO 03107710 12/2003
WO 2008049959 5/2008

OTHER PUBLICATIONS

Microsoft, "Step-by-Step Guide to Deploying Windows Mobile-based Dev Exchange Server 2003 SP2", Mar. 27, 2006.
(Continued)

*Primary Examiner* — Jeffrey Pwu
*Assistant Examiner* — Jayesh Jhaveri
(74) *Attorney, Agent, or Firm* — Integral Intellectual Property Inc.; Miriam Paton (57) ABSTRACT A method is provided for provisioning a device certificate. A device certificate request is transmitted from a communication device to a server in a communication network using an established communications channel between the communication device and the server. The device certificate request comprises at least a user identifier and a device identifier. The server provides to the communication device a device certificate that includes the user identifier and the device identifier and that is signed by a private key of a certificate authority.

40 Claims, 3 Drawing Sheets (56) References Cited

U.S. PATENT DOCUMENTS

| | | |
|---|---|---|
| 6,516,316 B1* | 2/2003 | Ramasubramani et al. ........ 1/1 |
| 6,721,787 B1 | 4/2004 | Hiscock |
| 6,789,068 B1 | 9/2004 | Blaze et al. |
| 6,980,660 B1* | 12/2005 | Hind et al. .................... 380/282 |
| 7,082,532 B1* | 7/2006 | Vick et al. .................... 713/155 |
| 7,100,044 B2* | 8/2006 | Watanabe et al. ............. 713/156 |
| 7,231,371 B1 | 6/2007 | Cantini et al. |
| 7,486,651 B2 | 2/2009 | Hagiwara et al. |
| 7,522,909 B2 | 4/2009 | Bushnell et al. |
| 7,529,933 B2 | 5/2009 | Palekar et al. |
| 7,584,360 B2 | 9/2009 | Kasaura et al. |
| 7,676,846 B2* | 3/2010 | Robert et al. .................. 726/27 |
| 7,735,126 B2* | 6/2010 | Zhang et al. .................. 726/10 |
| 7,840,812 B1 | 11/2010 | Levenberg |
| 7,925,878 B2* | 4/2011 | Merrien et al. ............... 713/155 |
| 2001/0054115 A1 | 12/2001 | Ferguson et al. |
| 2002/0038420 A1 | 3/2002 | Collins et al. |
| 2002/0046336 A1* | 4/2002 | Kon et al. ..................... 713/156 |
| 2002/0067832 A1 | 6/2002 | Jablon |
| 2002/0178370 A1 | 11/2002 | Gurevich et al. |
| 2003/0014629 A1* | 1/2003 | Zuccherato ................... 713/156 |
| 2003/0126433 A1 | 7/2003 | Hui |
| 2003/0196084 A1 | 10/2003 | Okereke et al. |
| 2003/0204734 A1 | 10/2003 | Wheeler |
| 2004/0242229 A1 | 12/2004 | Okazaki |
| 2004/0243804 A1* | 12/2004 | Tajima .......................... 713/175 |
| 2004/0268148 A1 | 12/2004 | Karjala et al. |
| 2005/0086467 A1* | 4/2005 | Asokan et al. ................ 713/155 |
| 2005/0144144 A1 | 6/2005 | Graff |
| 2005/0144485 A1 | 6/2005 | Mousseau |
| 2005/0154795 A1 | 7/2005 | Kuz et al. |
| 2005/0160161 A1 | 7/2005 | Barrett et al. |
| 2005/0188202 A1* | 8/2005 | Popp ............................. 713/175 |
| 2005/0287990 A1 | 12/2005 | Mononen et al. |
| 2006/0002556 A1* | 1/2006 | Paul .............................. 380/270 |
| 2006/0075242 A1 | 4/2006 | Aissi et al. |
| 2006/0080534 A1 | 4/2006 | Yeap et al. |
| 2006/0200814 A1 | 9/2006 | Kontinen et al. |
| 2006/0294368 A1 | 12/2006 | Adams et al. |
| 2007/0150723 A1 | 6/2007 | Estable et al. |
| 2007/0150740 A1 | 6/2007 | Davis et al. |
| 2007/0162741 A1* | 7/2007 | Kasaura et al. ............... 713/156 |
| 2008/0022103 A1 | 1/2008 | Brown et al. |
| 2008/0170690 A1 | 7/2008 | Tysowski |
| 2008/0170697 A1 | 7/2008 | Heinonen et al. |
| 2008/0250246 A1* | 10/2008 | Arditti et al. ................. 713/173 |
| 2009/0037728 A1* | 2/2009 | Kamikura .................... 713/156 |
| 2009/0222657 A1 | 9/2009 | Bender et al. |
| 2010/0100731 A1 | 4/2010 | Mok et al. |

OTHER PUBLICATIONS

Nystrom, M. et al., "PKCS #9: Selected Object Classes and Attribute Types", RFC 2985, Nov. 2000.

RSA Laboratories, "PKCS #10 v1.7: Certification Request Syntax Standard", May 26, 2000.

Veen, Gerardus, Extended European Search Report for EP 10175746.6, Dec. 23, 2010.

Veen, Gerardus, First Exam Report for EP06117582.4, Nov. 21, 2006.

Veen, Gerardus, Second Exam Report for EP06117582.4, Jun. 22, 2007.

Xueqing Li, Sara, Second Office Action for CA 2,593,888, Aug. 12, 2011.

Certificate Authority Proxy Function, Cisco IP Phone Authentication and Encryption for Cisco Call Manager, 4.0(1).

Jhaveri, Jayesh M., Fifth office Action for U.S. Appl. No. 11/458,783, Jan. 10, 2013.

Jhaveri, Jayesh M., Notice of Allowance for U.S. Appl. No. 11/458,783, Jul. 5, 2013.

Blackberry Security, White Paper, Release 4.0, 2005, Research in Motion Limited, XP-002373881.

Certificate Authority Proxy Function, Cisco IP Phone Authentication and Encryption for Cisco Call Manager, 4.0(1), 2004.

Provisioning Architecture Overview Version Mar. 14, 2001, Wireless Application Protocol WAP-182-ProvArch-20010314-a, Wireless Application Protocol Forum Ltd., XP-002253357.

Provisioning Bootstrap Version Mar. 14, 2001, Wireless Application Protocol WAP-182-ProvArch-20010314-a Wireless Application Protocol Forum Ltd., XP-002253355.

Push-to-talk over Cellular (PoC); Architecture; PoC Release 2.0, Technical Specification, Architecture V2.0.8 (Jun. 2004), XP-002324386.

Research in Motion Limited, "Blackberry Enterprise Server Version 3.6 for Microsoft Exchange", pp. 1-18, 2003.

S/MIME Support Package, Release 4.0, White Paper, 2005, Research in Motion Limited, XP-002373880.

Wireless Application Protocol, WAP-235-Push-OTA-20010425-a, Push OTA Protocol, XP-002240864, pp. 1-44, 25, 1999-2001.

Wireless LAN (WLAN End to End Guidelines for Enterprises and Public Hotspot Service Providers, Intel Communications, Release 1.1 Nov. 2003.

Xueqing Li, Sara, Third Office Action for CA 2,593,888 Oct. 30, 2012.

* cited by examiner

SYSTEM AND METHOD FOR PROVISIONING DEVICE CERTIFICATES

CROSS-REFERENCE TO RELATED APPLICATIONS

This application is a continuation of U.S. patent application Ser. No. 11/458,783, filed Jul. 20, 2006, which is incorporated by reference herein in its entirety.

TECHNICAL FIELD

The present invention relates generally to digital security and specifically to a system and method for provisioning device certificates.

BACKGROUND

The continued growth of telecommunication networks has led to the proliferation of communication devices that are used for the transfer of both voice and data. Personal Digital Assistants (PDAs) and smart-phones are examples of wireless communication devices that enable users to communicate via voice communications, electronic mail (e-mail), Short Message Service (SMS) messages as well as instant messaging. Additionally, many of these devices also include Web browsers and other applications to provide the users with information and access to remote data.

Due to their portability and ever-increasing functionality, wireless communication devices are becoming a necessity in today's business environment. Conducting business on the Internet is often efficient and cost effective, particularly when products and services can be distributed electronically.

However, as more people have access to the network and more data becomes available on the network, the risk of the wrong people accessing sensitive data increases. Accordingly, it is desirable for many network administrators to limit the devices that can access their network. One mechanism for limiting such access is the use of device certificates.

A device certificate is defined as a public key certificate or an attribute certificate tying the identity of a device to its attributes. An example of the use of digital certificates is the Device Certificate Service provided by VeriSign®. The VeriSign® Device Certificate Service embeds X.509 certificates into hardware devices, which allows service providers to perform strong authentication of their devices. Device manufacturers order certificates in bulk by providing a list of Media Access Control (MAC) addresses or unique device identifiers for the certificates. The issued certificates are returned to the manufacturers, who can then incorporate the process of injecting the certificates into the target devices as part of its overall device manufacturing process.

However, the process of assigning digital certificates during manufacture places an unnecessary burden on the manufacturing process. Further, it limits the digital certificate to a single certifying authority, regardless of the device's purchaser.

U.S. patent application Ser. No. 11/002,315 filed by Tet Hin Yeap et al and titled "System and Method for Access Control" teaches a system for restricting access based on device certificates. In order to assign a certificate to a device, Yeap teaches a system administrator transmitting an email request. The email includes unique identifiers of both the device and an access server. Both identifiers are used to generate a certificate, which is transmitted to the device via an email.

However, the use of the access server identifier ties the device to a single access server. Further, the method requires an email from a system administrator to initiate the certificate. For application in less technically sophisticated companies, such a step would provide an unnecessary burden on the user.

Lastly, in a document titled "Step-by-Step Guide to Deploying Windows Mobile-based Devices with Microsoft Exchange Server 2003 SP2: Appendix A. Deploying Exchange ActiveSync with Certificate-Based Authentication" a method for certificate enrolment configuration is taught. The document teaches a system administrator configuring an Extensible Markup Language (XML) script for device certificate enrolment. The XML script is uploaded to Active Directory using Microsoft Visual Basic Scripting Edition (VBScript). Active Directory is a Microsoft® directory service provided by a network server that provides means to manage identities and relationships that make up a network environment. Accordingly, when a user "cradles" a device, it connects to a corporate network via software on the user's computer. At this point, the XML script created by the administrator is delivered to the device and the certificate enrolment can begin.

However, similar to the previously described solution, the solution presented by this document is difficult to implement. Further, it requires that the device be able to communicate with a server via a cradle arrangement. Such a set-up precludes wireless certificate registration.

Accordingly, there is a need for a method of provisioning device certificates that overcomes the limitations of the prior art.

BRIEF DESCRIPTION OF THE DRAWINGS

Embodiments of the present invention will now be described by way of example only with reference to the following drawings in which.

DETAILED DESCRIPTION

For convenience, like numerals in the description refer to like structures in the drawings. A certificate creation request is bootstrapped on to an activation process and generated by the device itself. During this process, the device creates a certificate request in the form of a certificate service request. This certificate service request includes both a device identifier and a corresponding user's identifier to bind the two together.

In accordance with one embodiment there is provided a method for provisioning a device certificate on a device configured to communicate wirelessly with a plurality of back-end servers via a communication network including a mobile data server, the method comprising the steps of: initiating an activation request to the mobile data server for activating the device on the communication network; during activation of the device, providing a device certificate request to the mobile data server for the device, the device certificate request including at least a user identifier, a device identifier and a device public key, wherein the device certificate request is forwarded from the mobile data server to a predefined certification authority; and receiving a device certificate from the predefined certification authority in response to the device certificate request.

In accordance a further embodiment there is provided a wireless communication device configured to: initiate an activation request to a mobile data server for activating the device on a communication network; during activation of the device, provide a device certificate request to the mobile data server for the device, the device certificate request including at least a user identifier, a device identifier and a device public key, wherein the device certificate request is forwarded from the mobile data server to a predefined certification authority; and receive a device certificate from the predefined certification authority in response to the device certificate request.

Figure 1:
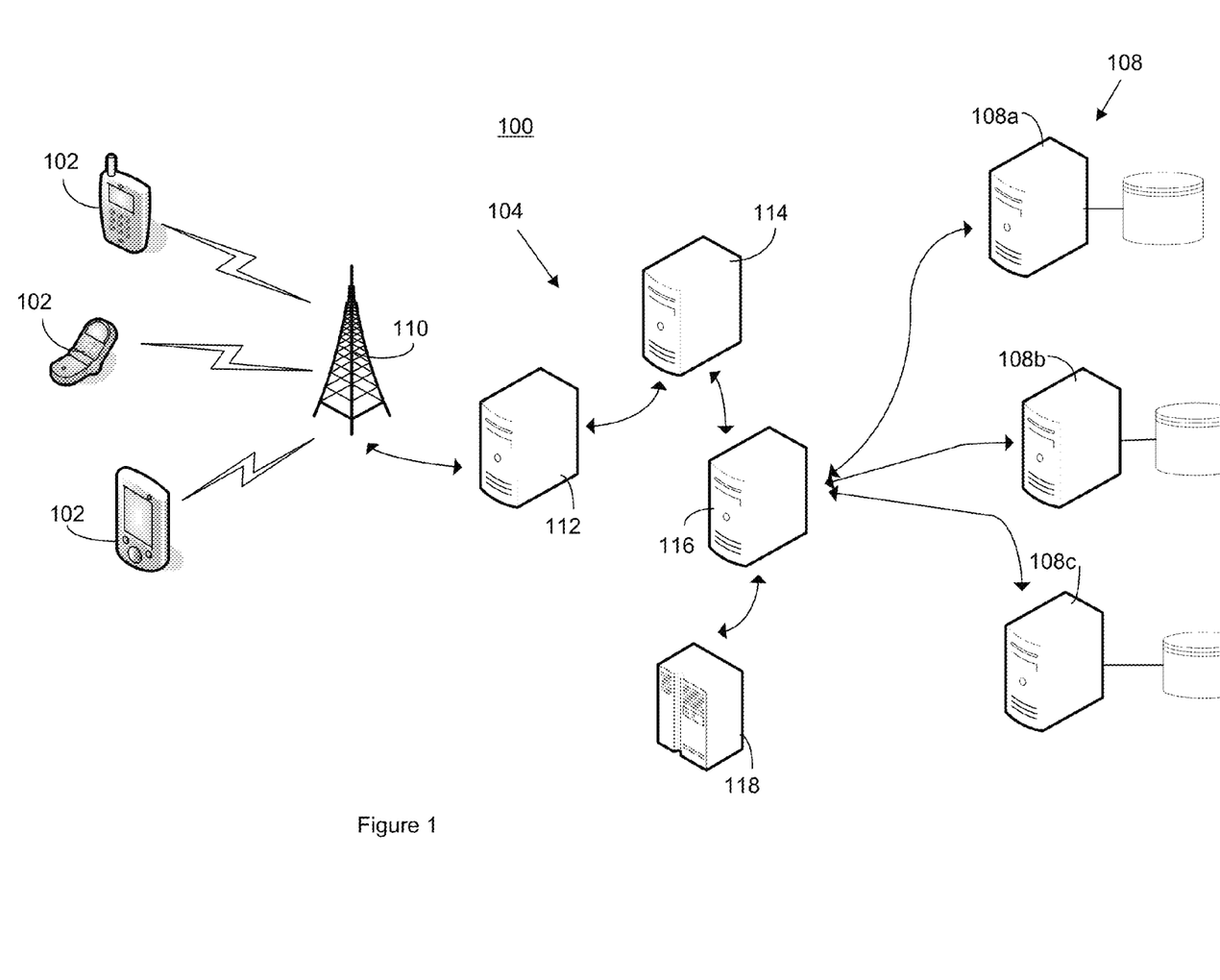
FIG. 1 is a block diagram illustrating a communication network infrastructure.

Referring to FIG. 1, a communication network infrastructure for a wireless communication device is illustrated generally by numeral 100. The communication infrastructure 100 comprises a plurality of communication devices 102, or simply devices 102, a communication network 104, a certification authority (CA) 118 and a plurality of backend servers 108.

The devices 102 include wireless computing devices such as a smart phone, a personal digital assistant (PDA), and the like. The devices 102 are in communication with one or more of the backend servers 108 via the communication network 104. Accordingly, the communication network 104 may include several components such as a wireless network 110, a relay 112, a corporate server 114 and/or a mobile data server 116 for relaying data between the devices 102 and the backend servers 108. An example of a mobile data server 116 is the BlackBerry Enterprise Server provided by Research in Motion.

The backend servers 108 include servers such as a Web server 108a, an application server 108b, and an application server with web services 108c. It will be appreciated by a person of ordinary skill in the art that the network architecture described herein is exemplary and that changes may be made to one or more components to accommodate different network configurations without affecting the scope of the invention described and claimed herein.

Figure 3:
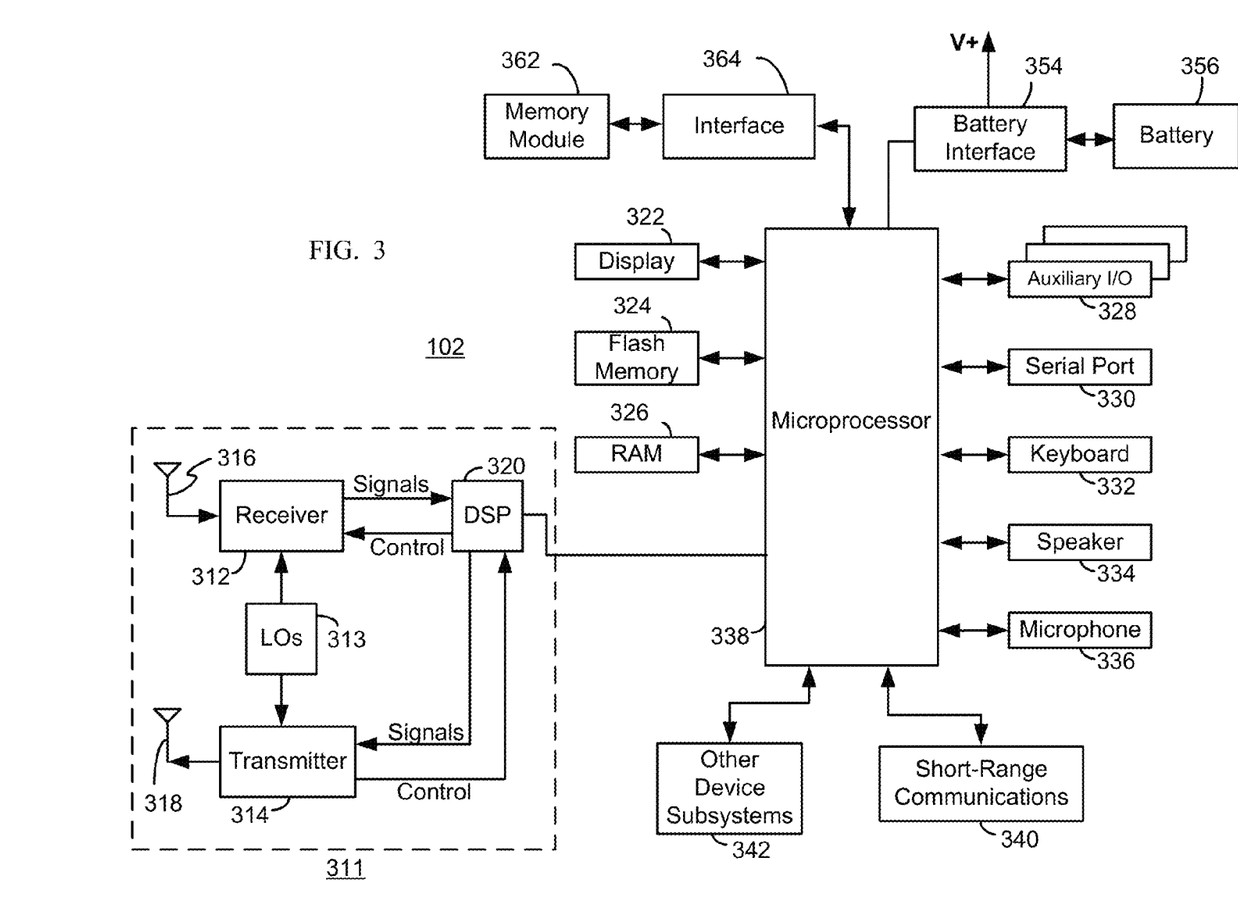
FIG. 3 is a block diagram illustrating a mobile device.

Referring to FIG. 3, a typical device 102 is illustrated in more detail. The device 102 is often a two-way communication device having both voice and data communication capabilities, including the capability to communicate with other computer systems. Depending on the functionality provided by the device mobile, it may be referred to as a data messaging device, a two-way pager, a cellular telephone with data messaging capabilities, a wireless Internet appliance, or a data communication device such as a PDA (with or without telephony capabilities).

The device 102 includes a communication subsystem 311, which includes a receiver 312, a transmitter 314, and associated components, such as one or more embedded or internal antenna elements 316 and 318, local oscillators (LOs) 313, and a processing module such as a digital signal processor (DSP) 320. As will be apparent to those skilled in field of communications, the particular design of the communication subsystem 311 depends on the communication network in which device 102 is intended to operate.

The device 102 includes a microprocessor 338 which controls general operation of the device 102. The microprocessor 338 also interacts with additional device subsystems such as a display 322, a flash memory 324, a random access memory (RAM) 326, auxiliary input/output (I/O) subsystems 328, a serial port 330, a keyboard 332, a speaker 334, a microphone 336, a short-range communications subsystem 340 such as Bluetooth™ for example, and any other device subsystems or peripheral devices generally designated at 342. Operating system software used by the microprocessor 338 is preferably stored in a persistent store such as the flash memory 324, which may alternatively be a read-only memory (ROM) or similar storage element (not shown). Those skilled in the art will appreciate that the operating system, specific device applications, or parts thereof, may be temporarily loaded into a volatile store such as RAM 326.

The microprocessor 338, in addition to its operating system functions, preferably enables execution of software applications on the device 102. A predetermined set of applications, which control basic device operations, is installed on the device 102 during its manufacture. These basic operations typically include data and voice communication applications, for example. Additionally, applications may also be loaded onto the device 102 through the communication network 104, an auxiliary I/O subsystem 328, serial port 330, short-range communications subsystem 340, or any other suitable subsystem 342, and installed by a user in RAM 326 or preferably a non-volatile store (not shown) for execution by the microprocessor 338. Such flexibility in application installation increases the functionality of the device 102 and may provide enhanced on-device features, communication-related features, or both.

The display 322 is used to visually present an application's graphical user interface (GUI) to the user. The user can manipulate application data by modifying information on the GUI using an input device such as the keyboard 332 for example. Depending on the type of device 102, the user may have access to other types of input devices, such as, for example, a scroll wheel, light pen or touch sensitive screen.

Figure 2:
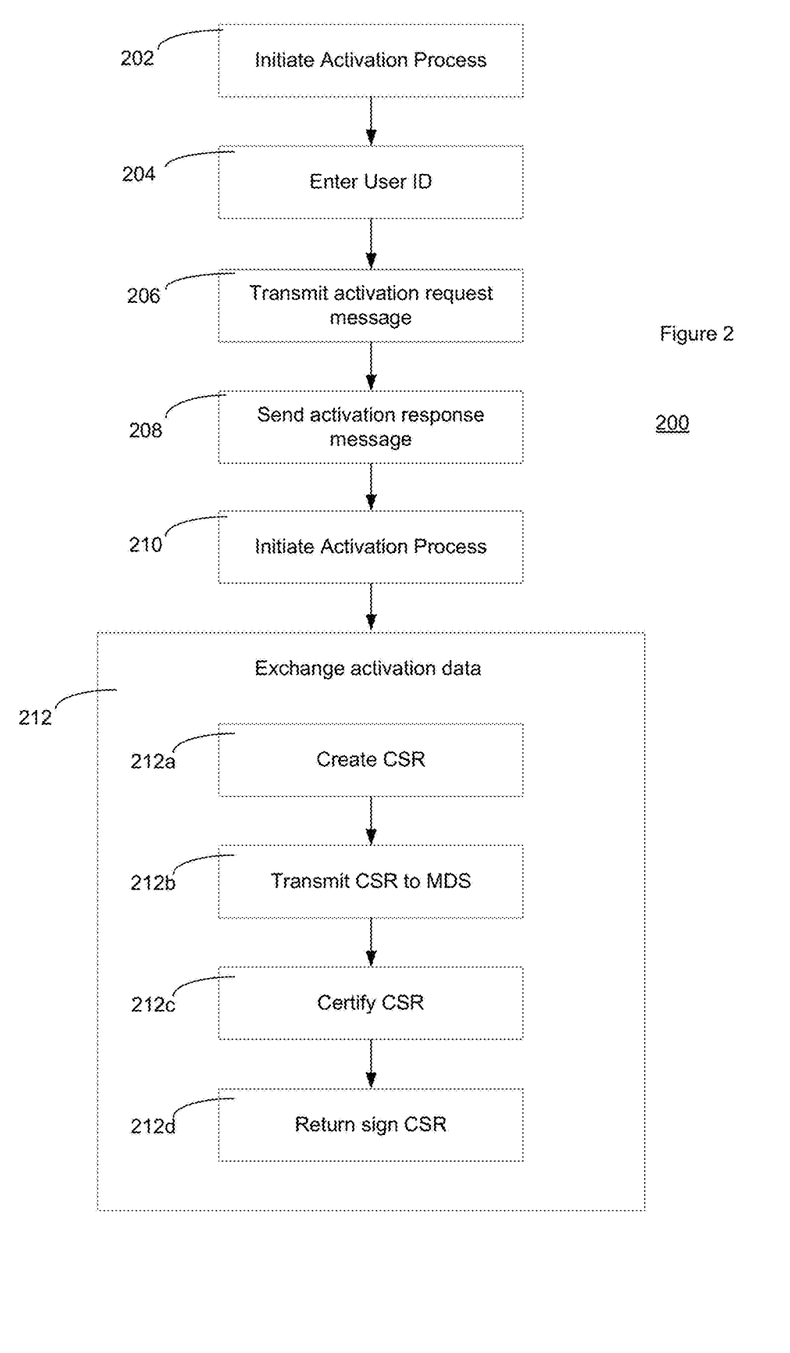
FIG. 2 is a flow chart illustrating a device provisioning process.

Before the user can use the device 102 to access the backend servers 108, an activation process registers the device 102 with the communication network 104. The activation process is an application executing on the device. The activation process may be part of the device operating system or an addition thereto. Referring to FIG. 2, a flow diagram illustrating the activation process is illustrated generally by numeral 200.

In step 202, the activation process is initiated. In the present embodiment, the activation process is initiated by the user selecting an activation program on the device 102. However it will be appreciated that the activation process could be initiated by the device 102 itself upon startup or at a predetermined time, for example. Furthermore, the activation process could be initiated by the user via a website using a pre-existing network connection, such as using a personal computer with Internet access for example.

Once the activation process is initiated, it continues at step 204. In step 204, the user is prompted to enter user identification. In the present embodiment, the user identification includes a pre-assigned electronic mail (email) address and an activation password. The activation password is established by a system administrator for the purpose of the activation process. In the present embodiment, the system administrator can be either a corporate Information Technology (IT) department or a service provider, depending on the implementation selected by the user.

In step 206, the device 102 transmits an activation request message to the mobile data server 116. The activation request message includes information about the device 102, such as routing information and the device's activation public keys, for example. In the present embodiment, this is achieved by transmitting an activation request email to the user's email account. The mobile data server 116 receives the activation request email en route and retrieves the information.

In step 208, the mobile data server 116 sends an activation response message to the device 102. The activation response message includes information about the mobile data server 116 such as routing information and the mobile data server's public keys, for example. In the present embodiment, this is achieved by transmitting an activation request email that is received by the device 102.

In step 210, the mobile data server 116 and the device 102 establish a master encryption key. Both the mobile data server 116 and the device 102 verify their knowledge of the master encryption key to each other. Generation and verification of such a master encryption key is beyond the scope of the present invention and it will be appreciated that any appropriate state-of-the-art or proprietary technique may be used.

One such technique is described in detail in Applicant's co-pending U.S. application Ser. No. 11/093,954, titled "Deploying and Provisioning Wireless Handheld Devices", and filed Mar. 30, 2005. Using this technique, the user generates a long-term encryption key pair and a short-term authentication key pair. The authentication key pair is generated using a shared secret. In the present embodiment, the shared secret is the activation password. The public keys of both key pairs are used as the activation public keys.

Once the device's public keys are received by the mobile data server 116, the user is verified. Once the device 102 is verified, the mobile data server 116 generates its own short-term authentication key pair, also using the activation password. The mobile data server 116 also generates its own long-term encryption key pair. Using the public keys generated by the device 102 and the activation password, the mobile data server 116 generates a master encryption key. The activation password provides the authentication necessary to trust the information exchanged. The mobile data server's short-term public authentication key, long-term public encryption key, a key confirmation value calculated using the newly generated master encryption key, and a known string, are sent to the device 102.

The device 102 receives the information from the mobile data server 116 and generates the device's own master encryption key. With this master key the device 102 verifies the key confirmation value. For example, the key confirmation value could be the hash of the master key the known string, as agreed upon by the device 102 and the mobile data server 116. If the key confirmation value does not verify, the master key created by the device 102 is not trusted, and it is assumed that someone is trying to compromise the connection. If the master encryption key generated by the device 102 seems valid, the device 102 sends a final key confirmation value to the mobile data server 116. The mobile data server 116 receives the message, verifies the key confirmation value and marks the device 102 as ready to go. Therefore, it will be appreciated that a secure communications tunnel can be established between the requesting device 102 and the mobile data server 116, and therefore the CA 118, even before the activation process is completed.

At this point the user and the mobile data server have been verified and full data exchange can securely take place using the corresponding long-term encryption key as desired. Data exchange may comprise e-mail messages, hypertext transfer protocol (HTTP)-based traffic, such as extensible markup language (XML), wireless markup language (WML), or other forms of data. Accordingly, if the master encryption key confirmation succeeds, the activation process proceeds with further communication being encrypted as desired.

In step 212, the mobile data server 116 and device 102 exchange data to facilitate further communication between the device 102 and the communication network 104 as well as the backend servers 108. As part of this data exchange, the device 102 requests, and is assigned, a device certificate.

In step 212a, the device 102 creates a certificate request using a digital certificate protocol. In the present embodiment, the device 102 creates a certificate signing request (CSR) using the Public-Key Cryptography Standards No. 10 (PKCS10) protocol. The PKCS10 protocol is well known in the art and need not be described in detail. It was developed by RSA Laboratories and is described in a document titled "PKCS #10 v1.7: Certification Request Syntax Standard", dated May 26, 2000. Although PKCS10 is used to implement the CSR, any appropriate protocol may used, as will be appreciated by a person of ordinary skill in the art.

In accordance with the PKCS10 protocol, a CSR has the following syntax:

```
PKCSReq CertificationRequest ::= SEQUENCE {
    certificationRequestInfo SEQUENCE {
        version INTEGER,
        subject Name,
        subjectPublicKeyInfo SEQUENCE {
            algorithm AlgorithmIdentifier,
            subjectPublicKey BIT STRING
        }
        attributes [0] Attributes {{ CRIAttributes }}
    }
    signatureAlgorithm AlgorithmIdentifier,
    signature BIT STRING
}
```

Version is a version number of the PKCS10 protocol. It is used for compatibility with future revisions. Subject is the name of the certificate subject. SubjectPublicKeyInfo contains information about the public key being certified. The information identifies the entity's public-key algorithm and any associated parameters.

The attributes are a collection of data providing additional information about the subject of the certificate. More information about attribute types is provided in PKCS No. 9, developed by RSA Laboratories and described in a document titled "PKCS #9 v2.0: Selected Object Classes and Attribute Types", dated Feb. 25, 2000. Alternately, the attributes may be locally defined. In accordance with the present embodiment, the attributes are used to transmit the user's email address as well as a personal identification number (PIN) associated with the device 102 as part of the CSR. This act binds the two identifiers together.

In step 212b, the CSR is received by the mobile data server 116, which has a predefined certification authority (CA 118) associated with it. Often, the CA 118 is a third party such as VeriSign® or Entrust®, for example. However, the mobile data server 116 may also act as its own CA 118. In this manner, a company or organization could operate the CA 118.

In step 212c, the CSR is transmitted to the predefined CA 118 for certification. The CA 118 signs the CSR with its private key and the signed CSR becomes the device certificate. In step 212d, the device certificate is returned to the device 102 for future use, when required.

Once the device 102 has the device certificate at its disposal, the mobile data server 116 can use it to ensure that the device is allowed on the communication network 104. For example, if the user is fired or the device is compromised, the CA 118 can revoke the device certificate.

In general, a server or user manually checks to see if a device certificate has been revoked. This can be accomplished either by checking a Certificate Revocation List (CRL) that is published by the CA 118 by making an Online Certificate Status Protocol (OCSP) request. Accordingly, in order to check the status of a device certificate the mobile data server 116 can periodically make OCSP requests or check the CA's CRL.

After determining that a certificate has been revoked, the mobile data server 116 can automatically send a Kill command to the device 102 to disable it. The use of the device certificate helps to reduce the chance of activating the Kill command on the wrong device.

Alternately, the mobile data server 116 could refrain from forwarding traffic to and/or from the device 102 in the event that the digital certificate has been revoked. Therefore, it also reduces the chance of having an unwanted device on the network.

Accordingly, it will be seen that the embodiment described above provides a relatively simple method for obtaining a device certificate for a wireless device. Moreover, the device certificate is obtained when the device is provisioned on the communication network 104, thus limiting fraudulent use of the devices 102 and access to sensitive data on one or more of the backend servers 108.

Although the embodiment described describes a specific implementation, a person of ordinary skill in the art will appreciate that other embodiments may also be realized.

For example, in the embodiment described above, the activation request message is an email. However, other forms of messaging may also be used successfully. For example, a custom handshaking protocol may be implemented or an alternate messaging protocol, such as Short Messaging Service (SMS) may be used.

Further, although the previous embodiment describes using an email address to identify the user and a PIN to identify the device 102, other parameters may be used. For the user, sufficient information to uniquely identify him or her is desired. Therefore, a social insurance number may suffice. Other information like name, address, telephone number, employer and the like, or any combination thereof, may also be sufficient to identify the user as required.

Similarly, rather than use the PIN to identify the device 102, other information such as a serial number, a mobile identification number (MIN), or International Mobile Subscriber Identity (IMSI), for example, may be used. Such information may be used alone, or in combination, as required.

In the embodiments described above, the mobile data server 116 polls the CA 118 to determine the status of a device certificate. In an alternate embodiment, the CA 118 transmits a notification to the mobile data server 116 when the certificate is revoked. In such an embodiment, the CA 118 maintains a correlation between the mobile data server 116 and the device certificate when the CSR is submitted.

In all of the embodiments described above, generation of a device certificate is a dynamic operation that takes place during the activation of the device. A further benefit of this arranged is realized when the system administrator has established its own CA 118. In this case, their own CA 118 can issue the device certificates. This feature increases the amount of trust the system administrator has in the device certificate process.

Further, although the invention has been described with reference to certain specific embodiments, various modifications thereof will be apparent to those skilled in the art without departing from the spirit and scope of the invention as defined by the appended claims.

What is claimed is:

1. A method at a communication device for provisioning a device certificate, the method comprising:
    transmitting a device certificate request to a server in a communication network using an established communications channel between the communication device and the server, wherein the device certificate request comprises at least a user identifier and a device identifier; and
    responsive to transmitting the device certificate request, receiving a device certificate that comprises a signed version of the device certificate request that is signed by a private key of a certification authority, the device certificate binding together the user identifier and the device identifier.

2. The method as recited in claim 1, further comprising:
    enabling user input of the user identifier at the communication device.

3. The method as recited in claim 1, wherein the device certificate request is transmitted to the server in a communication that is encrypted with a master communication key established between the server and the communication device.

4. The method as recited in claim 3, wherein the device certificate is received from the server in a communication that is encrypted with the master communication key.

5. The method as recited in claim 1, wherein the server acts as the certification authority.

6. The method as recited in claim 1, wherein the certification authority is a third party certification authority.

7. The method as recited in claim 1, wherein the user identifier is associated with a person and comprises one or more of the following: a number assigned by a government agency to the person, an identification of an employer of the person, a name or address or both of the person, a telephone number of the person.

8. The method as recited in claim 1, wherein the device identifier comprises one or more of the following: a device personal identification number, a device serial number, and a device International Mobile Subscriber Identity (IMSI).

9. A method at a server in a communication network, the method comprising:
    receiving a device certificate request from a communication device over an established communications channel between the communication device and the server, wherein the device certificate request comprises at least a user identifier and a device identifier; and
    responsive to receiving the device certificate request, providing to the communication device a device certificate that comprises a signed version of the device certificate request that is signed by a private key of a certification authority, the device certificate binding together the user identifier and the device identifier.

10. The method as recited in claim 9, wherein the device certificate request is received by the server in a communication that is encrypted with a master communication key established between the server and the communication device.

11. The method as recited in claim 10, wherein the device certificate is provided to the communication device by the server in a communication that is encrypted with the master communication key.

12. The method as recited in claim 9, wherein the server acts as the certification authority.

13. The method as recited in claim 9, wherein the certification authority is a third party certification authority.

14. The method as recited in claim 9, wherein the user identifier is associated with a person and comprises one or more of the following: a number assigned by a government agency to the person, an identification of an employer of the person, a name or address or both of the person, a telephone number of the person.

15. The method as recited in claim 9, wherein the device identifier comprises one or more of the following: a device personal identification number, a device serial number, and a device International Mobile Subscriber Identity (IMSI).

16. A communication device configured:
to establish a master communication key with a server in a communication network for encryption and decryption of communication with the server;
to transmit a device certificate request to a server in a communication network using an established communications channel between the communication device and the server, wherein the device certificate request comprises at least a user identifier and a device identifier; and
responsive to transmitting the device certificate request, to receive a device certificate that comprises a signed version of the device certificate request that is signed by a private key of a certification authority, the device certificate binding together the user identifier and the device identifier.

17. The communication device as recited in claim 16, further configured to:
enable user input of the user identifier at the communication device.

18. The communication device as recited in claim 16, wherein the device certificate request is transmitted to the server in a communication that is encrypted with a master communication key established between the server and the communication device.

19. The communication device as recited in claim 18, wherein the device certificate is received from the server in a communication that is encrypted with the master communication key.

20. The communication device as recited in claim 16, wherein the server acts as the certification authority.

21. The communication device as recited in claim 16, wherein the certification authority is a third party certification authority.

22. The communication device as recited in claim 16, wherein the user identifier is associated with a person and comprises one or more of the following: a number assigned by a government agency to the person, an identification of an employer of the person, a name or address or both of the person, a telephone number of the person.

23. The communication device as recited in claim 16, wherein the device identifier comprises one or more of the following: a device personal identification number, a device serial number, and a device International Mobile Subscriber Identity (IMSI).

24. A server comprising:
a processor; and
a communication interface coupled to the processor;
wherein the server is configured:
to receive, via the communication interface, a device certificate request from a communication device over an established communications channel between the communication device and the server, wherein the device certificate request comprises at least a user identifier and a device identifier; and
responsive to receiving the device certificate request, to provide, via the communication interface, to the communication device a device certificate that comprises a signed version of the device certificate request that is signed by a private key of a certification authority, the device certificate binding together the user identifier and the device identifier.

25. The server as recited in claim 24, wherein the device certificate request is received, via the communication interface, by the server in a communication that is encrypted with a master communication key established between the server and the communication device.

26. The server as recited in claim 25, wherein the device certificate is provided, via the communication interface, to the communication device by the server in a communication that is encrypted with the master communication key.

27. The server as recited in claim 24, wherein the server acts as the certification authority.

28. The server as recited in claim 24, wherein the certification authority is a third party certification authority.

29. The server as recited in claim 24, wherein the user identifier is associated with a person and comprises one or more of the following: a number assigned by a government agency to the person, an identification of an employer of the person, a name or address or both of the person, a telephone number of the person.

30. The server as recited in claim 24, wherein the device identifier comprises one or more of the following: a device personal identification number, a device serial number, and a device International Mobile Subscriber Identity (IMSI).

31. A non-transitory computer-readable medium having stored thereon executable instructions which, when executed by a processor of a communication device, cause the communication device to:
transmit a device certificate request to a server in a communication network using an established communications channel between the communication device and the server, wherein the device certificate request comprises at least a user identifier and a device identifier; and
responsive to transmitting the device certificate request, receive a device certificate that comprises a signed version of the device certificate request that is signed by a private key of a certification authority, the device certificate binding together the user identifier and the device identifier.

32. The non-transitory computer-readable medium as recited in claim 31, wherein the device certificate request is transmitted to the server in a communication that is encrypted with a master communication key established between the server and the communication device.

33. The non-transitory computer-readable medium as recited in claim 32, wherein the device certificate is received from the server in a communication that is encrypted with the master communication key.

34. The non-transitory computer-readable medium as recited in claim 31, wherein the user identifier is associated with a person and comprises one or more of the following: a number assigned by a government agency to the person, an identification of an employer of the person, a name or address or both of the person, a telephone number of the person.

35. The non-transitory computer-readable medium as recited in claim 31, wherein the device identifier comprises one or more of the following: a device personal identification number, a device serial number, and a device International Mobile Subscriber Identity (IMSI).

36. A non-transitory computer-readable medium having stored thereon executable instructions which, when executed by a processor of a server in a communication network, cause the server to:
receive a device certificate request from a communication device over an established communications channel between the communication device and the server, wherein the device certificate request comprises at least a user identifier and a device identifier; and
responsive to receiving the device certificate request, provide to the communication device a device certificate that comprises a signed version of the device certificate request that is signed by a private key of a certification authority, the device certificate binding together the user identifier and the device identifier.

37. The non-transitory computer-readable medium as recited in claim 36, wherein the device certificate request is received by the server in a communication that is encrypted with a master communication key established between the server and the communication device.

38. The non-transitory computer-readable medium as recited in claim 37, wherein the device certificate is provided to the communication device by the server in a communication that is encrypted with the master communication key.

39. The non-transitory computer-readable medium as recited in claim 36, wherein the user identifier is associated with a person and comprises one or more of the following: a number assigned by a government agency to the person, an identification of an employer of the person, a name or address or both of the person, a telephone number of the person.

40. The non-transitory computer-readable medium as recited in claim 36, wherein the device identifier comprises one or more of the following: a device personal identification number, a device serial number, and a device International Mobile Subscriber Identity (IMSI).

* * * * *